US011660522B2

(12) United States Patent
Seol (10) Patent No.: US 11,660,522 B2
(45) Date of Patent: May 30, 2023

(54) SYSTEM AND METHOD FOR PROVIDING GOLF INFORMATION FOR GOLFER (71) Applicant: Comart system Co.,Ltd., Seoul (KR)

(72) Inventor: Chang Hoon Seol, Seoul (KR)

(73) Assignee: Comart system Co., Ltd., Seoul (KR)

(*) Notice: Subject to any disclaimer, the term of this patent is extended or adjusted under 35 U.S.C. 154(b) by 0 days.

(21) Appl. No.: 17/516,719

(22) Filed: Nov. 2, 2021

(65) Prior Publication Data

US 2022/0203204 A1 Jun. 30, 2022

(30) Foreign Application Priority Data

Dec. 29, 2020 (KR) .......... 10-2020-0185692
Jul. 28, 2021 (KR) .......... 10-2021-0098894

(51) Int. Cl.
A63B 71/06 (2006.01)
G06T 7/70 (2017.01)
G06T 7/50 (2017.01)
G06V 20/00 (2022.01)
H04N 23/90 (2023.01)
(Continued)

(52) U.S. Cl.
CPC .......... *A63B 71/0622* (2013.01); *G06F 16/29* (2019.01); *G06T 7/50* (2017.01); *G06T 7/70* (2017.01); *G06V 20/00* (2022.01); *H04L 67/12* (2013.01); *H04N 23/661* (2023.01); *H04N 23/90* (2023.01); *A63B 2071/0691* (2013.01); *A63B 2102/32* (2015.10); *A63B 2220/05* (2013.01); *A63B 2220/14* (2013.01); *A63B 2220/20* (2013.01); *A63B 2220/807* (2013.01); *A63B 2225/20* (2013.01); *G06T 2207/30224* (2013.01); *G06T 2207/30228* (2013.01)

(58) Field of Classification Search
CPC ............ A63B 2102/32; A63B 2220/05; A63B 2220/14; G06T 2207/30224; G06T 2207/30228; G06T 7/50; G06T 7/70; G06V 20/00; G06V 20/42
See application file for complete search history.

(56) References Cited

U.S. PATENT DOCUMENTS 9,344,842 B2 * 5/2016 Huston .................. H04L 67/52
10,237,465 B2 * 3/2019 Chan .................. G09B 19/0038
(Continued)

FOREIGN PATENT DOCUMENTS

KR 10-2001-0082417 A 8/2001
KR 10-2017-0014841 A 2/2017
(Continued)

*Primary Examiner* — Boubacar Abdou Tchoussou
(74) *Attorney, Agent, or Firm* — Revolution IP, PLLC (57) ABSTRACT A system for providing golf information, the system which includes a green photographing unit for photographing an image of an area including a green on a golf course and communicatively connected to a communication network to transmit green image data to an outside, a golfer terminal that is carried by a golfer on the golf course and communicatively connected to a communication network to transmit golfer position data to the outside, and an information providing server that is communicatively connected to the communication network to generate golf information using the green image data and the golfer position data and transmit the generated golf information to the golfer terminal.

19 Claims, 7 Drawing Sheets (51) Int. Cl.
   *H04N 23/661*   (2023.01)
   *H04L 67/12*    (2022.01)
   *G06F 16/29*    (2019.01)
   *A63B 102/32*   (2015.01)

(56) References Cited

U.S. PATENT DOCUMENTS

| | | | | |
|---|---|---|---|---|
| 2002/0004723 | A1* | 1/2002 | Meifu | A63B 69/36 |
| | | | | 705/1.1 |
| 2003/0103001 | A1* | 6/2003 | Huston | G01S 19/19 |
| | | | | 342/357.57 |
| 2005/0037872 | A1* | 2/2005 | Fredlund | A63B 24/0021 |
| | | | | 473/407 |
| 2005/0101415 | A1* | 5/2005 | Sweeney | A63B 69/3676 |
| | | | | 473/407 |
| 2011/0230245 | A1* | 9/2011 | Carr | A63B 24/0059 |
| | | | | 463/7 |
| 2012/0007885 | A1* | 1/2012 | Huston | H04W 4/029 |
| | | | | 345/633 |
| 2016/0306036 | A1* | 10/2016 | Johnson | G06T 7/254 |
| 2021/0089761 | A1* | 3/2021 | Tyomkin | G06V 40/23 |
| 2021/0409656 | A1* | 12/2021 | Imes | H04N 5/77 |
| 2022/0400202 | A1* | 12/2022 | Imes | G06V 20/42 |

FOREIGN PATENT DOCUMENTS

| | | |
|---|---|---|
| KR | 10-1828869 B1 | 2/2018 |
| KR | 10-2018-0059624 A | 6/2018 |

* cited by examiner

SYSTEM AND METHOD FOR PROVIDING GOLF INFORMATION FOR GOLFER

CROSS-REFERENCE TO RELATED PATENT APPLICATIONS

This application claims the benefit of Korean Patent Application Nos. 10-2020-0185692, filed on Dec. 19, 2020, and 10-2021-0098894, filed on Jul. 28, 2021, in the Korean Intellectual Property Office, the disclosures of which are incorporated herein in their entirety by reference.

BACKGROUND OF THE INVENTION

1. Field of the Invention

The present invention relates to a system and method for providing a golfer with necessary information during play on a golf course.

2. Description of the Related Art

As a prior patent document related to the present invention, Korean Patent Registration No. 10-1828869 discloses a method for providing golf information by busing a mobile terminal on a golf course, the method including loading terrain information on the golf course by using the mobile terminal, acquiring position information and orientation information in real time by using the mobile terminal, obtaining an image by using a camera module of the mobile terminal, extracting information on a preset specific position existing within a photographing angle of view by using the camera module based on the position information and the orientation information obtained by the mobile terminal, and matching the extracted information on the specific position with the image captured by the camera module and displaying the image. However, in this prior art, since a golfer who is a user needs to directly capture an image, this is inconvenient to use.

In addition, as another prior art related to the present invention, Korean Patent Application Laid-Open No. 10-2001-0082417, which is a prior patent document, discloses a configuration in which a system including a camera and an image compression and transmission server is constructed for the purpose of managing, observing, securing, monitoring, inspecting and promoting the appearance of an outdoor golf course through the Internet in real time for 24 hours. However, this prior art is only to play, record, and store a transmitted video by an outdoor golf course manager and simply provide the video to people who have access to the Internet.

SUMMARY OF THE INVENTION

The present invention provides a system and method for efficiently providing a golfer with necessary information during play on a golf course.

According to an aspect of the present invention, there is provided a system for providing golf information, the system including: a green photographing unit for photographing an image of an area including a green on a golf course and communicatively connected to a communication network to transmit green image data to an outside; a golfer terminal that is carried by a golfer on the golf course and communicatively connected to a communication network to transmit golfer position data to the outside; and an information providing server that is communicatively connected to the communication network to generate golf information using the green image data and the golfer position data and transmit the generated golf information to the golfer terminal.

According to another aspect of the present invention, there is provided a method for providing golf information by using a system for providing golf information including a green photographing unit for photographing an image of an area including a green on a golf course and communicatively connected to a communication network to transmit green image data to an outside, a golfer terminal that is carried by a golfer on the golf course and communicatively connected to a communication network to transmit golfer position data to the outside, and an information providing server that is communicatively connected to the communication, the method including: an image acquisition step in which the information providing server acquires the green image data transmitted through the communication network; an image processing step in which the information providing server processes the green image data to recognize a hole cup or a hole cup flagpole in the green; a hole cup information generating step in which hole cup information including position information of the hole cup is generated by the information providing server by using the hole cup or the hole cup flagpole recognized through the image processing step; a golf ball information generating step in which golf ball information including position information of the golf ball is generated by the information providing server; a golf information generating step in which golf information including a distance between the hole cup and the golf ball is generated by the information providing server by using the hole cup information and the golf ball information; and an information transmission step in which the golf information is transmitted by the information providing server to the golfer terminal through the communication network, wherein the information providing server generates the golf ball information by using the golf ball recognized through the image processing step or the golfer's position information transmitted from the golfer terminal.

According to another aspect of the present invention, there is provided a method for providing golf information by using a system for providing golf information including a green photographing unit for photographing an image of an area including a green on a golf course and communicatively connected to a communication network to transmit green image data to an outside, a golfer terminal that is carried by a golfer on the golf course and communicatively connected to a communication network to transmit golfer position data to the outside, and an information providing server that is communicatively connected to the communication network, the method including: an information request confirming step in which service information requested by the golfer is confirmed by the information providing server; an event verification step in which an occurrence of an event corresponding to the service information requested by the golfer is verified by the information providing server after the service information requested by the golfer is verified through the information request verification step; a service image generating step in which, when the occurrence of the event corresponding to the service information requested by the golfer is verified through the event verification step, a service image to be transmitted to the golfer is generated by the information providing server; and a service image transmission step in which the service image is provided to the golfer by the information providing server, wherein the service image includes green image data about the event captured by the IP camera in response to the service information request.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the configuration and operation of embodiments of the present invention will be described in detail with reference to the drawings.

Figure 1:
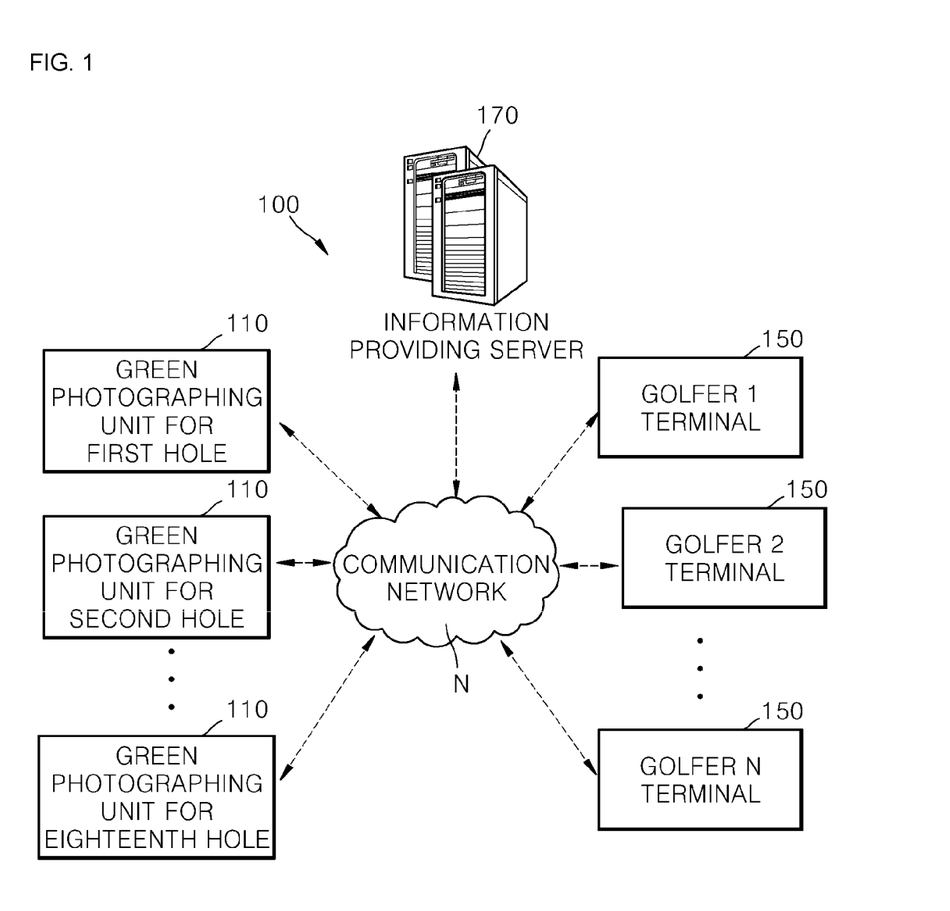
FIG. 1 is a block diagram showing a schematic configuration of a system for providing golf information according to an embodiment of the present invention.

FIG. 1 is a block diagram showing the configuration of a system for providing golf information according to an embodiment of the present invention. Referring to FIG. 1, a system 100 for providing golf information according to an embodiment of the present invention includes a plurality of green photographing units 110 that photograph an image of an area including a green for each hole in a golf course, a golfer terminal 150 that each of a plurality of golfers carries during golf play, and an information providing server 170 that generates golf information and provides the golf information to a golfer through the golfer terminal 150. The plurality of green photographing units 110, the golfer terminal 150, and the information providing server 170 are communicatively connected through a communication network N. In the present embodiment, the communication network N is described as a local network within the golf course, such as a Wireless Fidelity (WiFi) network within the golf course, and the present invention is not limited thereto. The communication network N may be an Internet communication network or a combination of an Internet communication network and a local network within the golf course, and may be a wired communication network in addition to a wireless communication network. In the system 100 for providing golf information, the information providing server 170 generates golf information in real time by using image data of the green transmitted from the green photographing unit 110 and the golfer's position data transmitted from the golfer terminal 150, and transmits the golf information to the golfer terminal 150 and provides the golf information to the golfer.

Figure 2:
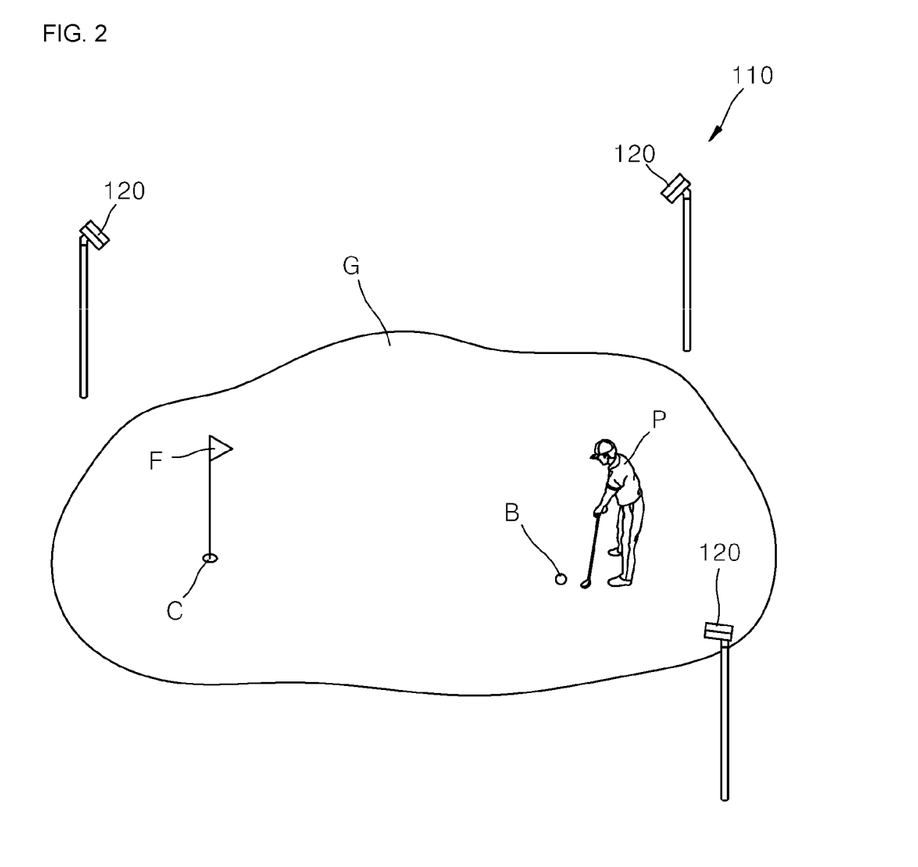
FIG. 2 is a view showing an example of a green photographing unit in the system for providing golf information shown in FIG. 1.

The plurality of green photographing units 110 photograph an image of an area including the green for each hole in the golf course. For example, as shown, in the case of a golf course including a total of 18 holes, the green photographing unit 110 is installed for each hole, so that all 18 green photographing units 110 may be used. Unlike this, in the case of a golf course including a total of 9 holes, the green photographing unit 110 is installed for each hole, so that all 9 green photographing units 110 may be used. FIG. 2 shows an example of the green photographing unit 110. Referring to FIG. 2, the green photographing unit 110 includes a plurality of IP cameras 120 for photographing a green G to be photographed. The plurality of IP cameras 120 are installed to photograph the green G from different directions in order to prevent the green G from being blocked. The plurality of IP cameras 120 need to be installed so as not to interfere with golf play. The plurality of IP cameras 120 transmit green image data, which is image information about the photographed green G, to the information providing server 170 through the communication network N. Thus, image data on the greens of all holes of the golf course is transmitted to the information providing server 170 in real time.

Figure 3:
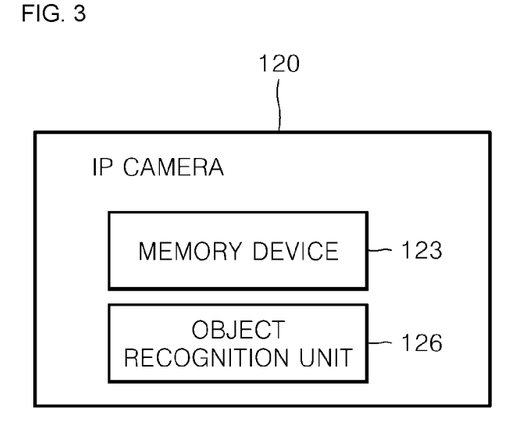
FIG. 3 is a block diagram schematically showing the configuration of an IP camera in the green photographing unit shown in FIG. 2.

FIG. 3 is a block diagram of a schematic configuration of the IP camera 120. Referring to FIG. 3, the IP camera 120 includes a camera memory device 123 that stores green image data, which is image information about the photographed green G, and a camera object recognition unit 126 that recognizes an object from the green image data.

The camera memory device 123 stores green image data, which is image information about the green G photographed by the IP camera 120, in real time. The green image data stored in the camera memory device 123 may be transmitted to the information providing server 170 through the communication network N according to a request of the information providing server 170. A secure digital (SD) card may be used as the camera memory device 123.

The camera object recognition unit 126 recognizes an object from the green image data in real time. In the present embodiment, a recognition target object recognized by the camera object recognition unit 126 will be describing as including a golfer (P in FIG. 2), a hole cup (C in FIG. 2), a hole cup flagpole (F in FIG. 2), and a golf ball (B in FIG. 2). In the present embodiment, the camera object recognition unit 126 will be described as recognizing an object by using a recognition function learned by a typical artificial intelligence (AI).

In the present embodiment, the green photographing unit 110 is described as having three IP cameras 120, however, the green photographing unit 110 may include two or four or more IP cameras 120, which also belongs to the scope of the present invention.

The golfer terminal 150 is a wireless communication terminal that each of a plurality of golfers carries while playing golf. The golfer terminal 150 is communicatively connected to the information providing server 170 through the communication network N. The golfer terminal 150 is preferably in a wearable form. In the present embodiment, the golfer terminal 150 is described as a wrist worn type worn on the golfer's wrist like a golfer's smart watch, but the present invention is not limited thereto. A belt worn type may be used, and this is also within the scope of the present invention. Although not shown, the golfer terminal 150 includes an image output unit such as a liquid crystal display (LCD) device, a sound output unit such as a speaker device, an input unit for recognizing a golfer's control command, a position recognition unit such as a global positioning system (GPS) device, a power supply unit such as a battery, and a communication unit for wireless communication with the outside. Since this configuration of the golfer terminal 150 includes a configuration that can be commonly used in a wearable terminal such as a smart watch, a detailed description thereof will be omitted. The golfer terminal 150 is controlled and operated according to a control command of the golfer input through the input unit, and transmits position information confirmed by the position recognition unit to the information providing server 170 through the communication network N, and outputs the golf information transmitted from the information providing server 170 through the communication network N through the image output unit and the sound output unit.

It is described that the input unit of the golfer terminal 150 is a button that appears on the image output unit. Unlike this, the input unit of the golfer terminal 150 may be a voice recognition device that recognizes a golfer's voice, or the input unit of the golfer terminal 150 may include both.

The input unit of the golfer terminal 150 recognizes a first control command and a second control command. The first control command is that when the golfer is in an area other than the green G on the golf course (this is referred to as a 'field' in the present embodiment), the golfer inputs the first control command to request related golf information, and the second control command is that when the golfer is on the green G on the golf course, the golfer inputs the second control command to request related golf information. For input of the first control command, the input unit may provide, for example, a button called 'field', and for input of the second control command, the input unit may provide, for example, a button called 'green'. That is, when the golfer presses the 'field' button in the input unit of the golfer terminal 150, golf information required in the field is output through the image output unit or the sound output unit, and when the golfer presses the 'green' button in the input unit of the golfer terminal 150, golf information required on the green is output through the image output unit or the sound output unit.

The image output unit or the sound output unit of the golfer terminal 150 outputs the golf information transmitted from the information providing server 170. The golf information output through the image output unit or the sound output unit includes a distance between the golf ball and the hole cup. Also, a gradient of the green G may be output through the image output unit. Additionally, safety information for preventing safety accidents may be output through the image output unit or the sound output unit. The golfer terminal 150 is worn and used by a plurality of golfers who play golf on the golf course at the same time.

The golfer terminal 150 may output various advertisements through the image output unit and the sound output unit. The revenue generated by the advertisement output through the golfer terminal 150 may be distributed to an operator of a system for providing golf information and an operator of the golf course at an appropriate ratio.

Also, the golfer terminal 150 may be a smartphone used by a golfer. When the golfer terminal 150 is a smartphone, an application for executing a system and method for providing golf information according to the present invention is installed in the smartphone.

Also, the input unit of the golfer terminal 150 recognizes a hole-in-one service request, a tee shot hole cup proximity service request, and other service requests by a golfer who uses the golfer terminal 150. The hole-in-one service request is requested by a golfer when a situation (hole-in-one) occurs when the golf ball enters the hole cup due to the golfer's tee shot, and the tee shot hole cup proximity service request is requested by the golfer when a situation occurs when the golf ball is located in a proximity distance set in the hole cup due to the golfer's tee shot, and other service requests are requested by the golfer when a situation occurs when the golf ball enters the hole cup with a good shot from a shot other than a tee shot.

The hole-in-one service request is requested by the golfer when a situation (hole-in-one) occurs when the golf ball enters the hole cup due to the golfer's tee shot, and the input unit of the golfer terminal 150 may provide a button called 'hole-in-one-service', for example, for recognition of the hole-in-one service request. That is, when the golfer presses the 'hole-in-one service' button provided by the golfer terminal 150, the golfer terminal 150 recognizes the hole-in-one service request. In response to the hole-in-one service request, the golfer terminal 150 receives a hole-in-one image from the information providing server 170. When the golfer can clearly see the condition of the green from a tee box, the golfer can request the hole-in-one service from the tee box, and otherwise, the golfer can request the hole-in-one service after moving to a position where the golfer can clearly see the condition of the green.

The tee shot hole cup proximity service request is requested by the golfer when a situation occurs when the golf ball is located in the proximity distance set in the hole cup due to the golfer's tee shot, and the input unit of the golfer terminal 150 may provide a button called 'tee shot hole cup proximity service', for example, for recognition of the tee shot hole cup proximity service. That is, when the golfer presses the 'tee shot hole cup proximity service' button provided by the golfer terminal 150, the golfer terminal 150 recognizes the tee shot hole cup proximity service request. In response to the tee shot hole cup proximity service request, the golfer terminal 150 receives a tee shot hole cup proximity image from the information providing server 170. In the present embodiment, the proximity distance is described as 1 m, but the present invention is not limited thereto. When the golfer can clearly see the condition of the green from the tee box, the tee box may request the tee shot hole cup proximity service, and otherwise, the golfer can request the tee shot hole cup proximity service after moving to a position where the golfer can clearly see the condition of the green.

Other service requests are requested by the golfer when a situation occurs when the golf ball enters the hole cup with a good shot from a shot other than a tee shot, and the input unit of the golfer terminal 150 may provide a button called 'other services', for example, for recognition of other service requests. That is, when the golfer presses the 'other service' button provided by the golfer terminal 150, the golfer terminal 150 recognizes other service requests. In the present embodiment, other services include albatross, eagle, birdie, chip-in birdie, hole-out by long putting, and the like in golf. In other words, the golfer makes a request for other services when he/she plays a good game such as an albatross, eagle, birdie, chip-in birdie, or hole-out by long putting. In response to other service requests, the golfer terminal 150 receives images such as albatross, eagles, buddies, chip-in buddies, hole-out by long putts, and the like from the information providing server 170. Other services may be requested immediately when the golfer can clearly see the condition of the green from a position where a shot was made, and otherwise, the golfer can request other services after moving to a position where the golfer can clearly see the condition of the green.

Figure 4:
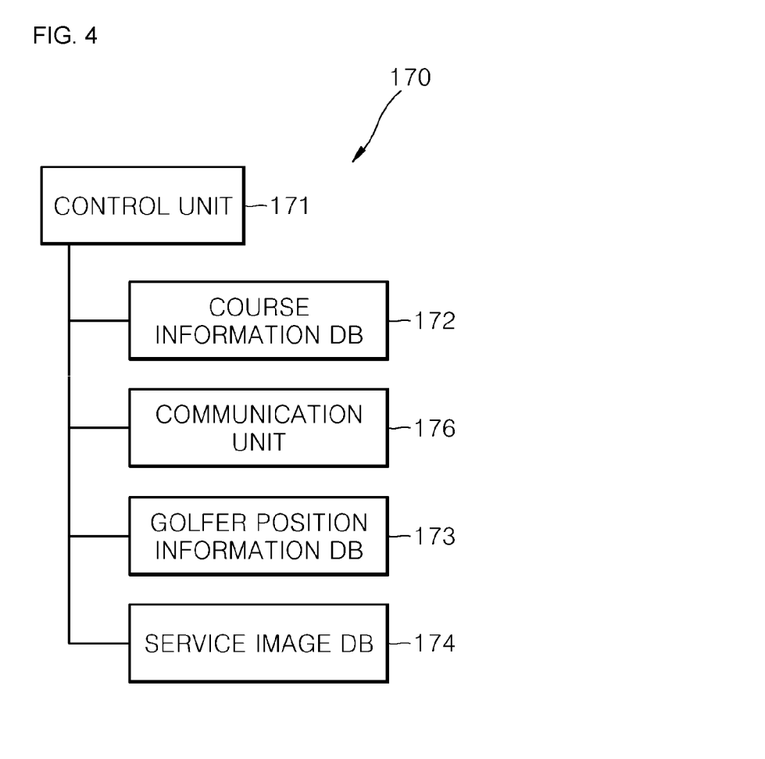
FIG. 4 is a block diagram schematically showing the configuration of an information providing server in the system for providing golf information shown in FIG. 1.

The information providing server 170 is communicatively connected to the communication network N to generate golf information using the green image data transmitted from the green photographing unit 110 and the golfer position data transmitted from the golfer terminal 150 and transmit the generated golf information to the golfer terminal 150. FIG. 4 is a block diagram schematically showing the configuration of the information providing server 170. Referring to FIG. 4, the information providing server 170 includes a control unit 171, a course information database 172 that stores course information on the golf course and is communicatively connected to the control unit 171 to exchange data, a golf position information database 173 that stores position data of the golfer in the golf course and is communicatively connected to the control unit 171, a service image database 174 in which a service image transmitted to the golfer is stored, and a communication unit 176 controlled by the control unit 171.

Figure 5:
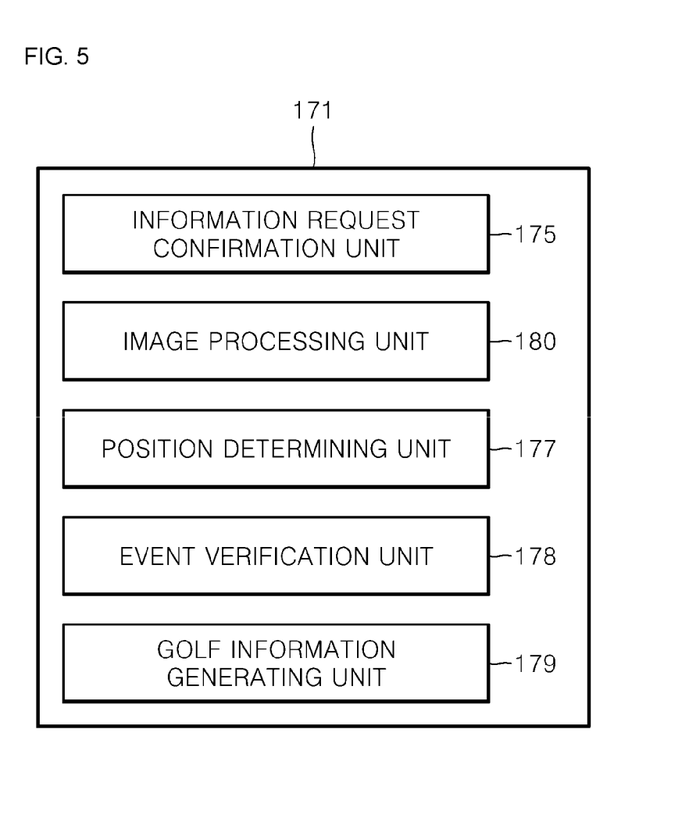
FIG. 5 is a block diagram schematically showing the configuration of a control unit in the information providing server shown in FIG. 4.

The control unit 171 exchanges data with the course information database 172 and exchange data with the plurality of green photographing units 110 and the plurality of golfer terminals 150 through the communication unit 176, thereby executing a golf information providing program. In terms of hardware, the control unit 171 may be configured as a central processing unit in which a golf information providing program stored in a memory is executed. FIG. 5 is a block diagram schematically showing the configuration of the control unit 171. Referring to FIG. 5, the control unit 171 includes an information request confirmation unit 175 for confirming information requested by the golfer P, an image processing unit 180 for processing green image data transmitted from the green photographing unit 110, a position determining unit 177 for determining positions of the hole cup C, the golf ball B, and the golfer P, an event verification unit 178 for verifying the occurrence of an event corresponding to service information requested by the golfer P, and a golf information generating unit 179 for generating golf information to be transmitted to the golfer terminal 150.

The information request confirmation unit 175 checks the service information requested by the golfer P. The golfer P performs a hole-in-one service request, a tee shot hole cup proximity service request, and other service requests by using the golfer terminal 150 used by the golfer P, and the golfer terminal 150 transmits the hole-in-one service request, the tee shot hole cup proximity service request, and other service requests to the information providing server 170 through the communication network N. The information request confirmation unit 175 receives and confirms the hole-in-one service request, the tee shot hole cup proximity service request, and other service requests transmitted from the golfer terminal 150.

The image processing unit 180 recognizes the hole cup C or the hole cup flagpole F in the green G by performing image processing on the green image data transmitted from the green photographing unit 110. To this end, the image processing unit 180 synthesizes images transmitted from the plurality of IP cameras 120 of the green photographing unit 110. Additionally, when the golf ball B is located on the green G, the image processing unit 180 performs image processing on the green image data transmitted from the green photographing unit 110 to recognize the golf ball B placed on the green G and the golfer P. A method by which the image processing unit 180 recognizes the hole cup C, the hole cup flagpole F, the golf ball B and the golfer P may use a typical AI function.

The position determining unit 177 determines in real time the absolute position of the hole cup C on the green G, the absolute position of the golf ball B, and the absolute position of each of the golfers P in play. The position of the hole cup C is determined by matching the hole cup C or the hole cup flagpole F recognized by the camera object recognition unit 126 or the image processing unit 180 to the course information stored in the course information database 172. In addition, the position of the golf ball B is determined by matching the golf ball B on the green G recognized by the camera object recognition unit 126 or the image processing unit 180 to the course information stored in the course information database 172, or is determined by the position information of the golfer terminal 150. Also, the position of the golfer is confirmed from the position of the golfer terminal 150, and the position of the golfer terminal 150 is confirmed through a signal transmitted from the position recognition unit provided in the golfer terminal 150. In the present embodiment, the golf terminal 150 transmits the position information to the information providing server 170 once every 10 to 60 seconds, and the position determining unit 177 checks whether the position information is transmitted to the information providing server 170 once every 10 to 60 seconds or not and determines that the position of the golfer P has been confirmed. The position by time of the golfer P confirmed by the position determination unit 177 is stored in the golfer position information database 173 of the information providing server 170 for a certain period of time.

The event verification unit 178 verifies the occurrence of an event corresponding to the service information requested by the golfer P. The event verification unit 178 verifies the occurrence of an event corresponding to the service information requested by the golfer P by using the object recognition information by the IP camera 120 or the image processing unit 180 transmitted from the IP camera 120 and the golfer position information stored in the golfer position information database 173. The event verification unit 178 verifies the occurrence of hole-in-one that is an event corresponding to the hole-in-one service requested by the golfer P, the occurrence of the golf ball's hole cup proximity situation by a tee shot, which is an event corresponding to the tee shot hole cup proximity service requested by the golfer P, and the occurrence of hole-out situations by albatross, eagle, buddy, chip-in buddy, and long putting, which are events corresponding to other services requested by the golfer P.

Verification of the occurrence of the hole-in-one situation may be performed, after the hole-in-one service request is confirmed by the information request confirmation unit 175, by automatically confirming that the golf ball B enters the hole cup C by receiving object recognition information transmitted from the IP camera 120 or the image processing unit 180, and confirming that the golfer P is located in the vicinity of the tee box at the corresponding time. In the present embodiment, it is described that the golf ball B entering the hole cup C is automatically confirmed by using the object recognition information by the IP camera 120 or the image processing unit 180, but unlike this, an administrator may directly check this through an image provided by the IP camera 120, which also falls within the scope of the present invention.

Verification of the occurrence of a situation in which the golf ball is close to the hole cup due to the tee shot, may be performed, after the tee shot hole cup proximity service request is confirmed by the information request confirmation unit 175, by automatically confirming that the golf ball B is located within a proximity distance set in the hole cup C by receiving object recognition information transmitted from the IP camera 120 or the image processing unit 180, and confirming that the golfer P is located in the vicinity of the tee box at the corresponding time. In the present embodiment, it is described that the golf ball B located within the proximity distance set in the hole cup C is automatically confirmed by using the object recognition information by the IP camera 120 or the image processing unit 180, but this Alternatively, the administrator may directly check this through an image provided by the IP camera 120, which also falls within the scope of the present invention.

Verification of the occurrence of a hole-out situation by albatross, eagle, buddy, chip-in buddy, and long putting, which are events corresponding to other services requested by the golfer P, may be performed, after other service requests are confirmed by the information request confirmation unit 175, by automatically confirming that the golf ball B enters the hole cup C by receiving object recognition information transmitted from the IP camera 120 or the image processing unit 180, and confirming the position of the golfer P at the corresponding time. In the present embodiment, it is described that the golf ball B entering the hole cup C is automatically confirmed by using the object recognition information by the IP camera 120 or the image processing unit 180, but unlike this, the administrator may directly check this through an image provided by the IP camera 120, which also falls within the scope of the present invention.

The golf information generating unit 179 generates golf information to be transmitted to the golfer terminal 150. The golf information generated by the golf information generating unit 179 is transmitted to the golfer terminal 150 through the communication unit 176. The golf information generating unit 179 generates golf information to be transmitted to the golfer terminal 150 in real time by using the position information of the hole cup C, the hole cup flagpole F, the golf ball B and the golfer determined by the position determining unit 177 and the course information stored in the course information database 172. Golf information generated by the golf information generating unit 179 includes a distance between the hole cup C and the golf ball B, a gradient of the green G, and safety information. The golf information generated by the golf information generating unit 179 is transmitted to the golfer terminal 150 requesting the information by the communication unit 176 through the communication network N.

In addition, the golf information generating unit 179 generates a service image as golf information to be transmitted to the golfer P. The golf information generating unit 179 may include a typical image editing software program. The operator of the system 100 for providing golf information edits and creates a service video to be transmitted to the golfer P in response to the service information requested by the golfer P by using the golf information generating unit 179. The information providing server 170 receives video data stored in the memory device 123 of the IP camera 120 of the video corresponding to the service information requested by the golfer P, and the operator edits the video by using the golf information generating 179. The service image generated by the golf information generating unit 179 may include a video of the green G captured by the IP camera 120 and an image showing the position of a golfer who made a shot in the hole. For example, in the case of the hole-in-one service, the service image to be transmitted to the golfer P may include a video showing a situation where the golf ball B enters an area of the green G and enters the hole cup C, and an image in which a position where the golfer P made a tee shot is displayed on a hole map. The service image generated through the golf information generating unit 179 is stored in the service image database 174. The service image generated through the golf information generating unit 179 may be transmitted not only to the golfer who requested the service, but also to other companion golfers. The information providing server 170 may transmit the generated service image to the registered golfer's online account (e.g., a Social Network Service (SNS) account such as KakaoTalk).

A more specific operation of the control unit 171 will be described later in detail with reference to FIGS. 6 and 7 in which a method for providing golf information by using the system 100 for providing golf information shown in FIG. 1 is shown as a flowchart.

The course information database 172 is configured as a hardware memory device and is communicatively connected to the control unit 171. The course information database 172 stores basic course information for each hole of the golf course. The basic course information for each hole stored in the course information database 172 includes map information of the hole. The basic course information stored in the course information database 172 is provided to the position determining unit 177 and the golf information generating unit 179 of the control unit 171 to be utilized for generating golf information. The course information database 172 also stores the image captured by the green photographing unit 110.

The golfer position information database 173 stores position data of the golfer in the golf course and is communicatively connected to the control unit 171. The golf course position data of the golfer stored in the golfer position information database 173 is stored and maintained for a certain period of time for each confirmed time.

The communication unit 176 is controlled by the control unit 171 and is used for communication with the plurality of green photographing units 110 and the plurality of golfer terminals 150.

Figure 6:
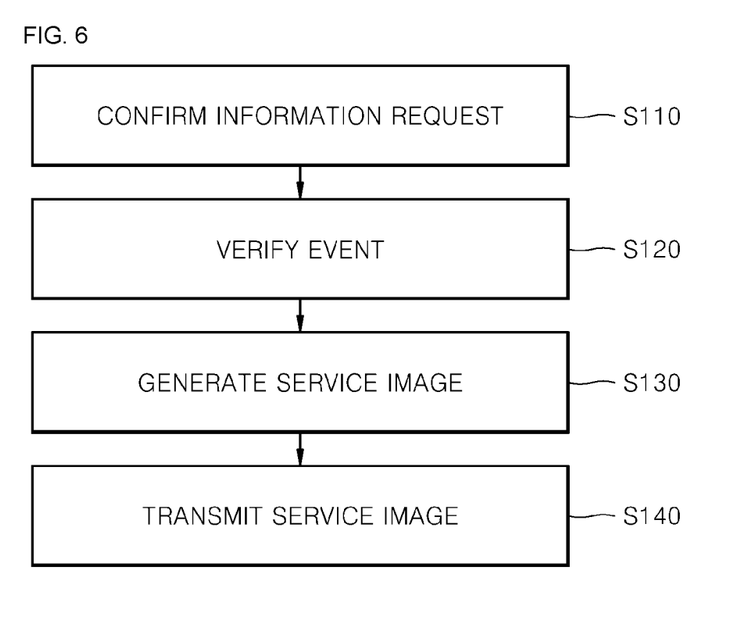
FIG. 6 is a view for describing a method for providing golf information by using the system for providing golf information shown in FIG. 1, according to an embodiment of the present invention.

FIG. 6 is a flowchart illustrating a method for providing golf information by using the system 100 for providing golf information shown in FIG. 1, according to an embodiment. Referring to FIGS. 1 through 5 together with FIG. 6, the method for providing golf information according to an embodiment of the present invention includes an information request confirmation step S110 in which service information requested by the golfer P is confirmed by the information providing server 170, an event verification step S120 in which, after the service information requested by the golfer P is confirmed by the information providing server 170 by the information request confirmation step S110, verifying the occurrence of the event corresponding to the service information requested by the golfer P, a service image generating step S130 in which, when the occurrence of an event corresponding to the service information request by the golf P is verified by the event verification step S120, generating a service image to be transmitted to the golfer P, and a service image transmission step S140 in which the service image generated through the service image generating step S130 is transmitted to the golfer P.

In the information request confirmation step S110, the service information requested by the golfer P is confirmed by the information providing server 170. The information request confirmation step S110 is performed by checking that the service information (any one of a hole-in-one service request, a tee shot hole cup proximity service request, and other service requests) requested by the golfer P by using the golfer terminal 150 is confirmed by the information request confirmation unit 175 of the information providing server 170. After the service information requested by the golfer P is confirmed through the information request confirmation step S110, the event verification step S120 is performed.

In the event verification step S120, after the service information requested by the golfer P is verified by the information request verification step S110, the occurrence of an event corresponding to the service information requested by the golfer P is verified. The event verification step S120 is performed by the event verification unit 178 of the information providing server 170. The event verification unit 178 verifies the occurrence of the vent corresponding to the service information requested by the golfer P by using the object recognition information by the IP camera 120 or the image processing unit 180 and the golfer position information stored in the golfer position information database 173. The event verification unit 178 verifies the occurrence of hole-in-one that is an event corresponding to the hole-in-one service requested by the golfer P, the occurrence of the golf ball's hole cup proximity situation by a tee shot, which is an event corresponding to the tee shot hole cup proximity service requested by the golfer P, and the occurrence of hole-out situations by albatross, eagle, buddy, chip-in buddy, and long putting, which are events corresponding to other services requested by the golfer P.

Verification of the occurrence of the hole-in-one situation may be performed, after the hole-in-one service request is confirmed by the information request confirmation unit 175, by automatically confirming that the golf ball B enters the hole cup C by receiving object recognition information transmitted from the IP camera 120 or the image processing unit 180, and confirming that the golfer P is located in the vicinity of the tee box at the corresponding time. In the present embodiment, it is described that the golf ball B entering the hole cup C is automatically confirmed by using the object recognition information by the IP camera 120 or the image processing unit 180, but unlike this, the administrator may directly check this through an image provided by the IP camera 120, which also falls within the scope of the present invention.

Verification of the occurrence of a situation in which the golf ball is close to the hole cup due to the tee shot, may be performed, after the tee shot hole cup proximity service request is confirmed by the information request confirmation unit 175, by automatically confirming that the golf ball B is located within the proximity distance set in the hole cup C by receiving object recognition information transmitted from the IP camera 120 or the image processing unit 180, and confirming that the golfer P is located in the vicinity of the tee box at the corresponding time. In the present embodiment, it is described that the golf ball B is located within the proximity distance set in the hole cup C is automatically confirmed by using the object recognition information by the IP camera 120 or the image processing unit 180, but unlike this, the administrator may directly check this through the image provided by the IP camera 120, which also falls within the scope of the present invention.

Verification of the occurrence of hole-out situations by albatross, eagle, buddy, chip-in buddy, and long putting, which are events corresponding to other service information requested by the golfer P, may be performed, after other services requests are confirmed by the information request confirmation unit 175, by automatically confirming that the golf ball B enters the hole cup C by receiving the object recognition information from the IP camera 120 or the image processing unit 180, and confirming the position of the golfer P at the corresponding time. In the present embodiment, it is described that the golf ball B entering the hole cup C is automatically confirmed by using the object recognition information by the IP camera 120 or the image processing unit 180, but unlike this, the administrator may directly check this through an image provided by the IP camera 120, which also falls within the scope of the present invention.

In the event verification step S120, an automatic verification method that is automatically checked using object recognition information by the IP camera 120 or the image processing unit 180, may be first performed, and if it is not confirmed in the automatic method, a manual verification method by which the administrator is requested to directly confirm a video, may be performed.

In the service image generating step S130, when the occurrence of an event corresponding to the service information requested by the golfer P is verified through the event verification step S120, a service image to be transmitted to the golfer P is generated. In the service image generating step S130, the generation of the service image is performed by the golf information generating unit 179 of the information providing server 170. The operator of the system 100 for providing golf information edits and creates a service video to be transmitted to the golfer P in response to the service information requested by the golfer P using the golf information generating unit 179. The information providing server 170 receives the video data stored in the memory device 123 of the IP camera 120 of the video corresponding to the service information requested by the golfer P, and the operator edits the video by using the golf information generating unit 179. The service image generated by the golf information generating unit 179 may include a video of the green G captured by the IP camera 120 and an image showing the position of a golfer who made a shot in the hole. For example, in the case of the hole-in-one service, the service image to be transmitted to the golfer P may include a video showing a situation where the golf ball B enters an area of the green G and enters the hole cup C, and a video showing a position where the golfer P made a tee shot, on a hole map. The service image generated through the service image generation step S130 is stored in the service image database 174.

In the service image transmission step S140, the service image generated through the service image generation step S130 and stored in the service image database 174 is transmitted to the golfer P. The service image transmission step S140 is performed by the control unit 171 of the information providing server 170. The control unit 171 may transmit the service image not only to the golfer who requested the service, but also to other companion golfers, and may transmit the service image to the registered golfer's online account (e.g., an SNS account such as KakaoTalk).

Figure 7:
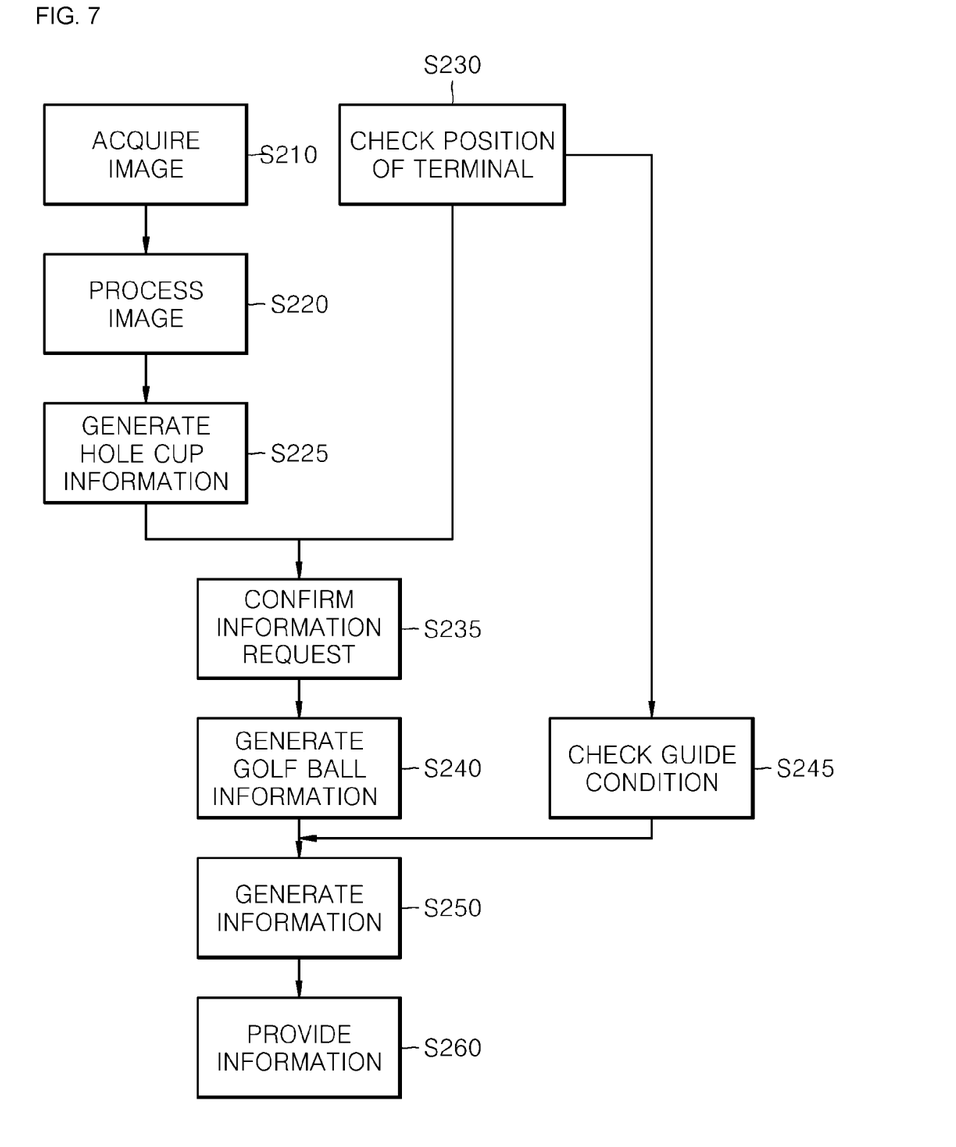
FIG. 7 is a flowchart illustrating a method for providing golf information by using the system for providing golf information shown in FIG. 1, according to another embodiment of the present invention.

FIG. 7 is a flowchart illustrating a method for providing golf information by using the system 100 for providing golf information shown in FIG. 1, according to another embodiment. Referring to FIGS. 1 to 5 together with FIG. 7, the method for providing golf information according to another embodiment of the present invention includes an image acquisition step S210 in which the information providing server 170 acquires green image data, an image processing step S220 in which the information providing server 170 processes the green image data to recognize the hole cup C or the hole cup flagpole F in the green G, a hole cup information generating step S225 in which hole cup information including the position information of the hole cup C is generated by using the hole cup C or the hole cup flagstick F recognized through the information providing server 170 in the image processing step 220, a terminal position checking step S230 in which the position of the golfer terminal 150 is checked using the information providing server 170, an information request confirming step S235 in which an information providing request transmitted from the golfer terminal 150 is confirmed, a golf ball information generating step S240 in which golf ball information including the position information of the golf ball B is generated by the information providing server 170, a risk guide condition checking step S245 in which it is checked whether the information providing server 170 satisfies a safety accident risk guide condition, a golf information generating step S250 in which the information providing server 170 generates golf information to be provided to the golfer terminal 150, and a golf information transmission step S260 in which the golf information generated by the information providing server 170 in the golf information generating step S250 is transmitted to the golfer terminal 150.

In the image acquisition step S210, green image data is acquired. The image acquisition step S210 is performed by acquiring the green image data transmitted by the green photographing unit 110 through the communication network by using the information providing server 170. The green image data acquired through the image acquisition step S210 may be stored in the course information database 172.

In the image processing step S220, image processing is performed on the green image data acquired in the image acquisition step S210. The image processing step S220 is performed by performing image processing on the image data by using the image processing unit 173 of the information providing server 170. The hole cup C or the hole cup flagpole F is recognized on the green G through the image processing step S220. When the golf ball B and the golfer P are on the green G, the golf ball B and the golfer P may also be recognized in the image processing step S220. The image processing step S220 may also be performed by the object recognition unit 126 of the IP camera 120.

In the hole cup information generating step S225, hole cup information including position information of the hole cup C is generated. The hole cup information generation step S225 is performed by the position determining unit 174 of the information providing server 170 determining the absolute position of the hole cup C. The position determining unit 174 matches the hole cup C or the hole cup flagpole F recognized through the image processing step S220 with the map information of the corresponding hole stored in the course information database 172 to determine the absolute position of the hole cup C.

In the terminal position checking step S230, the real-time position of each of the plurality of golfer terminals 150 is checked. The terminal position checking step S230 is performed by checking position information (GPS information) of the golfer terminal 150 transmitted by the position determination unit 174 of the information providing server 170 from the golfer terminal 150 through the communication network N.

In the information request confirming step S235, the information providing request transmitted by the golfer terminal 150 is confirmed. The information request confirming step S235 is performed by checking an information providing request signal transmitted by the golfer terminal 150 through the communication network N by using the information providing server 170. The information providing request signal transmitted by the golfer terminal 150 is when the golfer presses the field button or the green button. When the golfer presses the field button, the golf ball is on the field, and when the golfer presses the green button, the golf ball is on the green. When the information providing request is confirmed through the information request confirming step S235, the golf ball information generating step S240 is performed.

In the golf ball information generating step S240, golf ball information including the position information of the golf ball B is generated. The golf ball information generating step S240 is performed by determining the absolute position of the golf ball B by using the position determining unit 174 of the information providing server 170. When it is confirmed as an information request by the field button in the information request confirming step S235, the position determining unit 174 of the information providing server 170 determines the absolute position of the golf ball B in the terminal position confirming step S230. When it is confirmed that the information request is made by the green button in the information request confirming step S235, the golf ball B recognized through the image processing step S220 is matched with the map information of the corresponding hole stored in the course information database 172 to determine the absolute position of the golf ball B.

In the risk guide condition checking step S245, it is checked whether the safety accident risk guide condition is satisfied. The risk guide condition checking step S245 is performed by the position determining unit 174 of the information providing server 170 to determine the position of the plurality of golfer terminals 150. For example, when a player of a back team presses the field button to obtain distance information to the hole cup of the corresponding hole, if a player of a previous team is located within a safe distance, it is recognized that the safety accident risk guide condition is satisfied. The safety distance may be automatically calculated based on data according to pre-input gradient and weather information.

In the golf information generating step S250, golf information provided to the golfer terminal 150 is generated. The golf information generating step S250 is performed when the golf information generating unit 179 of the information providing server 170 generates golf information. There are two types of golf information generated by the golf information generating unit 179. One is golf play-related information generated according to the golfer's information request confirmed through the information request confirming step S235, and the other is safety-related information produced when it is confirmed that the safety accident risk guide condition is satisfied through the risk guide condition checking step S245.

First, in the case of golf play-related information generated according to a golfer's information request confirmed through the information request confirming step S235, the golf information generating unit 179 includes a distance between the golf ball and the hole cup, and a gradient of the green extracted through the image processing step S220 as golf information. Additionally, the golf information generating unit 179 may include recommendations for appropriate golf clubs.

Next, in the case of safety-related information, when it is confirmed that the safety accident risk guide condition is satisfied through the risk guide condition checking step S245, risk notification information is generated as text or voice data.

In the golf information transmission step S260, the golf information generated in the golf information generating step S250 is transmitted to the golfer terminal 150 by the information providing server 170 through the communication network N.

According to the present invention, all of the objects of the present invention described above can be achieved. Specifically, according to the present invention, the position of a hole cup is determined by recognizing the hole cup from green image data captured by a green photographing unit, a distance between the hole cup and a golf ball is calculated by checking the position of the golf ball through a terminal worn by a golfer, and the green image data is processed to check the slope of green so that necessary information can be efficiently provided to the golfer during play.

In addition, according to the present invention, the position of golfers is checked by using the terminal worn by the golfer, so that, when the golfer is located within a safe distance, risk is notified through voice or a text, the effect of preventing safety accidents is great.

In addition, according to the present invention, a service image corresponding to a request for providing information transmitted from a golfer terminal is generated so that the golfer can receive an image corresponding to an event such as a hole-in-one, an albatross, an eagle, or a buddy when an event occurs.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A system for providing golf information, the system comprising:
    a green photographing unit for photographing an image of an area including a green on a golf course and communicatively connected to a communication network to transmit green image data to an outside;
    a golfer terminal that is carried by a golfer on the golf course and communicatively connected to the communication network to transmit golfer position data to the outside; and
    an information providing server that is communicatively connected to the communication network to generate golf information using the green image data and the golfer position data and transmit the generated golf information to the golfer terminal,
    wherein the information providing server comprises an event verification unit configured to verify an occurrence of an event corresponding to a service information request transmitted from the golfer terminal,
    wherein the event verification unit is configured to verify the occurrence of the event corresponding to the service information request by using:
    a position of a golf ball which is automatically identified by the green image data; and
    a position of a golfer which is automatically identified by the golfer position data.

2. The system of claim 1, wherein the information providing server comprises an image processing unit that performs image processing on the green image data to recognize a hole cup or a hole cup flagpole in the green.

3. The system of claim 2, wherein the information providing server further comprises a course information database in which course information of the golf course is stored, and a position determining unit that matches the hole cup or hole cup flagpole recognized by the image processing unit with the course information to determine a position of the hole cup.

4. The system of claim 3, wherein the position determining unit further determines the position of the golf ball, and the information providing server further comprises an information generating unit for generating a distance between the position of the hole cup determined by the position determining unit and the golf ball as the golf information.

5. The system of claim 4, wherein, when the golf ball is recognized by the image processing unit, the position determining unit determines the position of the golf ball by matching the golf ball recognized by the image processing unit with the course information.

6. The system of claim 4, wherein, when the golf ball is not recognized by the image processing unit, the position determining unit determines the position of the golf ball based on the golfer position data.

7. The system of claim 2, wherein the information providing server calculates a gradient of the green from the green image data processed by the image processing unit and generates the gradient of the green as the golf information.

8. The system of claim 1, wherein the green photographing unit comprises a plurality of IP cameras that photograph the green in different directions.

9. The system of claim 1, wherein the golfer terminal comprises an input unit configured to receive a first control command and a second control command,
    wherein the first control command is input by the golfer to request the golf information in an area other than the green,
    wherein the second control command is input by the golfer to request the golf information on the green.

10. The system of claim 1, wherein a plurality of golfer terminals are provided, and the information providing server checks a distance between the plurality of golfer terminals in real time to generate safety distance information as the golf information.

11. The system of claim 1, wherein the information providing server generates a service image corresponding to the service information request transmitted from the golfer terminal and transmits the service image to the golfer terminal.

12. The system of claim 11, wherein the golfer terminal comprises an input unit for recognizing the service information request.

13. The system of claim 12, wherein the service information request comprises a hole-in-one service request, the hole-in-one service request is requested by the golfer through the input unit when a hole-in-one situation occurs, and the service image comprises green image data captured by the IP camera in response to the hole-in-one service request.

14. The system of claim 12, wherein the service information request comprises a tee shot hole cup proximity service request, the tee shot hole cup proximity service request is a request by the golfer through the input unit when a situation in which a golf ball is located within a proximity distance set in the hole cup occurs due to the golfer's tee shot, and the service image comprises green image data captured by the IP camera in response to the tee shot hole cup proximity service request.

15. The system of claim 12, wherein the service information request comprises other service requests, the other service requests are requested by the golfer through the input unit when any one of albatross, eagle, buddy, chip-in buddy, and hole-out by long putting occurs, and the service image comprises green image data captured by the IP camera in response to the other service requests.

16. The system of claim 1, wherein the IP camera comprises an object recognition unit for recognizing an object to be recognized from the green image data.

17. The system of claim 16, wherein the recognition target object comprises a golfer, a hole cup, a hole cup flagpole, and a golf ball.

18. A method for providing golf information by using a system for providing golf information including a green photographing unit for photographing an image of an area including a green on a golf course and communicatively connected to a communication network to transmit green image data to an outside, a plurality of golfer terminals that is carried by each of a plurality of golfers on the golf course and communicatively connected to the communication network to transmit golfer position data to the outside, and an information providing server that is communicatively connected to the communication, the method comprising:
- a terminal position checking step in which the information providing server checks a real-time position of each of the plurality of golfer terminals;
- a risk condition checking step in which the information providing server checks whether a safety accident risk guide condition is satisfied according to a safety distance;
- an image acquisition step in which the information providing server acquires the green image data transmitted through the communication network;
- an image processing step in which the information providing server processes the green image data to recognize a hole cup or a hole cup flagpole in the green;
- a hole cup information generating step in which hole cup information including position information of the hole cup is generated by the information providing server by using the hole cup or the hole cup flagpole recognized through the image processing step;
- a golf ball information generating step in which golf ball information including position information of a golf ball is generated by the information providing server;
- a golf information generating step in which the information providing server generates golf information including a golf play-related information and a safety-related information; and
- an information transmission step in which the golf information is transmitted by the information providing server to the golfer terminal through the communication network,
- wherein the information providing server generates the golf ball information by using the golf ball recognized through the image processing step or the golfer's position information transmitted from the golfer terminal,
- wherein the golf play-related information includes a distance information between the hole cup and the golf ball calculated based on the hole cup information and the golf ball information,
- wherein the safety-related information includes a safety accident risk guide information generated when the safety accident risk guide condition is satisfied,
- wherein the information providing server calculates a safety distance based on weather information data.

19. A method for providing golf information by using a system for providing golf information including a green photographing unit for photographing an image of an area including a green on a golf course and communicatively connected to a communication network to transmit green image data to an outside, a golfer terminal that is carried by a golfer on the golf course and communicatively connected to the communication network to transmit golfer position data to the outside, and an information providing server that is communicatively connected to the communication network, the method comprising:
- an information request confirming step in which service information requested by the golfer is confirmed by the information providing server;
- an event verification step in which an occurrence of an event corresponding to the service information requested by the golfer is verified by the information providing server after the service information requested by the golfer is verified through the information request verification step;
- a service image generating step in which, when the occurrence of the event corresponding to the service information requested by the golfer is verified through the event verification step, a service image to be transmitted to the golfer is generated by the information providing server; and
- a service image transmission step in which the service image is provided to the golfer by the information providing server,
- wherein the service image comprises green image data about the event captured by the IP camera in response to the service information request,
- wherein in the event verification step, the occurrence of the event corresponding to the service information request is verified by using:
- a position of a golf ball which is automatically identified by the green image data; and
- a position of a golfer which is automatically identified by the golfer position data.

* * * * *